Figure 1:
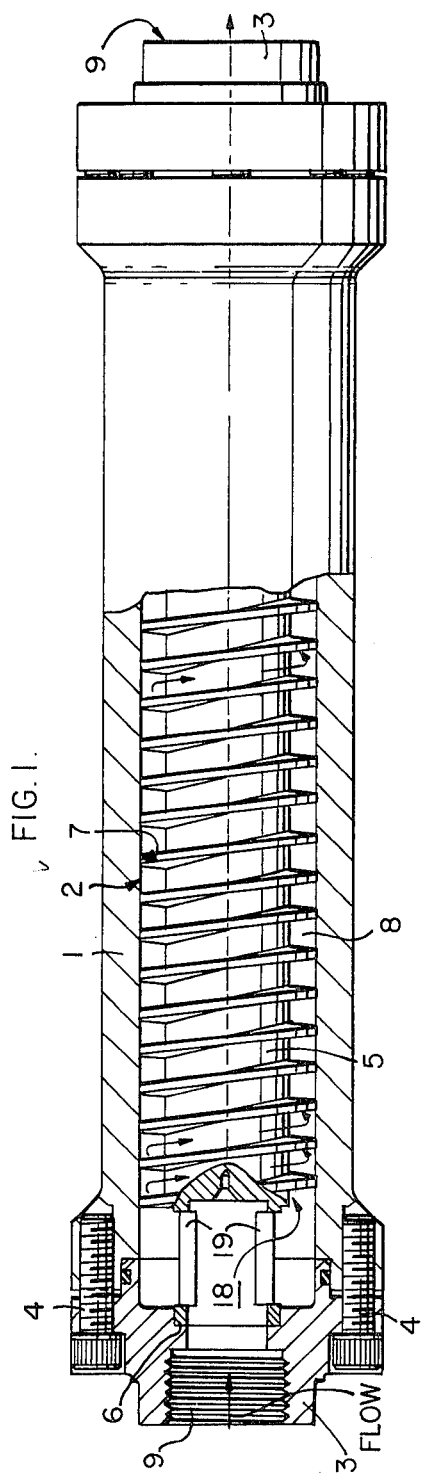

United States Patent [19]

Currie et al.

[11] 4,106,525
[45] Aug. 15, 1978

[54] FLUID PRESSURE CONTROL

[75] Inventors: John Alexander Currie, Paisley; Maurice McKenna; John Howard Upton, both of East Kilbride, all of Scotland

[73] Assignee: The Secretary of State for Industry in Her Britannic Majesty's Government of the United Kingdom of Great Britain and Northern Ireland, London, England

[21] Appl. No.: 768,628

[22] Filed: Feb. 14, 1977

[30] Foreign Application Priority Data

Feb. 20, 1976 [GB] United Kingdom ............... 6883/76

[51] Int. Cl.² .............................................. F15D 1/02
[52] U.S. Cl. ........................................ 138/43; 138/42; 138/44; 138/45; 138/46
[58] Field of Search ............... 138/42, 43, 44, 45, 138/45 A, 46; 251/121, 126

[56] References Cited

U.S. PATENT DOCUMENTS

| 16,848 | 3/1857 | McHenry | 138/42 |
|---|---|---|---|
| 880,087 | 2/1908 | Lusebrink | 251/126 X |
| 1,172,140 | 2/1916 | Jenkins | 138/42 |
| 1,763,687 | 6/1930 | Chodwick et al. | 251/126 X |
| 1,983,213 | 12/1934 | Brady et al. | 138/43 |
| 2,158,737 | 5/1939 | Wanseh | 251/121 |
| 2,316,729 | 4/1943 | Tryon | 251/126 X |
| 2,375,646 | 5/1945 | Grossi | 138/42 X |
| 3,200,842 | 8/1965 | Wilson | 251/126 X |
| 3,485,474 | 12/1969 | Baumann | 251/121 |
| 3,724,504 | 4/1973 | Matsui et al. | 251/126 X |

FOREIGN PATENT DOCUMENTS

| 288,071 | 12/1913 | Fed. Rep. of Germany | 251/126 |
|---|---|---|---|
| 626,444 | 2/1936 | Fed. Rep. of Germany | 251/126 |
| 619,475 | 4/1961 | Italy | 138/42 |

Primary Examiner—Richard E. Aegerter
Assistant Examiner—James E. Bryant, III
Attorney, Agent, or Firm—Cushman, Darby & Cushman

[57] ABSTRACT

A fluid flow restrictor is described having a long path length capable of absorbing energy with less noise generation than that normally encountered with conventional fluid flow restrictors of short path lengths. The restrictor is adapted for attachment between two adjacent lengths of a pipeline, three forms being particularly described, one of fixed path length and bore, another of fixed path length and variable bore, and a third of variable path length and fixed bore.

2 Claims, 5 Drawing Figures

FLUID PRESSURE CONTROL

This invention relates to the control of pressure of a fluid moving within a pipeline and is particularly concerned with the reduction of fluid pressure in a hydraulic circuit.

Reduction of the pressure of a moving fluid is normally achieved by restricting the flow, and hitherto such reduction has been achieved by incorporating either a relief valve or an orifice valve in the hydraulic circuit. However, such pressure reducing devices have only a short path length in which to absorb energy and consequently they generate a considerable amount of noise, both airborne and liquid-borne, which may be undesirable in the environment wherein the hydraulic circuit is required to operate.

The present invention seeks to provide a flow restrictor of long path length which is capable of absorbing energy in a less noisy fashion than the previously known, short path length devices.

According to the present invention, a fluid flow restrictor comprises a housing adapted for attachment between two consecutive lengths of a pipeline and having an internal duct of bore size less than that of the pipeline and of path length greater than the length of the housing, the duct being arranged to provide fluid communication between the two lengths of pipeline.

Preferably, the duct is arranged in helical form and, in the simplest form of the invention the restrictor may comprise a single tube wound as a helix and adapted at each end for fluid tight connection to an end of an adjoining length of the pipeline. Alternatively, the restrictor may be of any external shape convenient for coupling between two pipeline lengths and have an integrally formed helical duct communicating between the two ends of the restrictor. Such a restrictor may be fabricated, for example, by casting.

However, in one preferred arrangement of the invention the restrictor comprises a substantially cylindrical housing containing a cylindrical core, the external surface of which core is a light interference fit with the internal surface of the housing. A helical groove or grooves of regular cross-section is formed in either one of the two mating cylindrical surfaces ie in the outer surface of the core, or alternatively in the inner surface of the cylindrical housing, thereby providing, when the two components are assembled, a continuous helical duct or ducts throughout the length of the restrictor. Standard pipe couplings having fluid transfer ports arranged to communicate with the helical duct or ducts may be provided at each end of the housing to permit attachment to adjacent pipeline lengths provided with corresponding couplings.

In accordance with a further aspect of the invention there is provided a variable flow restrictor having a helical duct of adjustable cross-section. Conveniently, the helical duct is longitudinally partitioned by a dividing wall, which wall may be transversely moveable with respect to the duct or, alternatively, which duct may be transversely moveable with respect to the dividing wall. One such adjustable arrangement has a helically grooved cylindrical core which is a sliding fit within a cylindrical housing, the helical groove being partitioned by a co-operating helical fin, constituting the dividing wall, which is formed on the inner surface of the housing, said fin extending radially inwards to abut the base of the helical groove in the outer surface of the core. The thickness of the fin in the axial direction of the restrictor, is less than the width of the groove thus permitting a limited amount of longitudinal movement between the two assembled components.

The helical groove thus partitioned provides two parallel ducts, the relative width of which may be varied by sliding the core axially within the housing thereby mutually varying the width of each duct inversely with respect to the other.

The core and the housing is assembled to provide that only one of the two parallel ducts is accessible to incoming fluid. Consequently the cross-section of the helical duct through which the fluid flows may be varied from a maximum to a minimum by longitudinal adjustment of the core within the housing.

An alternative form of variable flow restrictor having a helical duct of adjustable effective length is also provided. One such arrangement again comprises a cylindrical housing containing an externally grooved cylindrical core but, in this case, the core is in the form of a hollow cylinder, open at one end and closed at the other. The helical groove is multi-turn and each 360° loop of the groove is provided with a fluid transfer port through to the inside of the hollow core, each of which ports is closeable by an inner cylindrical sleeve rotatably mounted within the core. The inner sleeve is provided with a slot-shaped aperture arranged in the form of a substantially single-turn helix extending axially along its length over a distance equal to the axial length of the multi-turn helical groove in the surrounding core. Rotation of the inner sleeve through one complete revolution aligns the aperture with each one of the fluid transfer ports in turn thus providing that any one port may be selectively opened to the interior of the sleeve.

It will be apparent that other dispositions and shapes are possible for the ports formed through the core and for the aperture formed through the sleeve. For example, the ports may be disposed along the line of a single turn helix on the core and the aperture will then be formed as a straight slot in the sleeve. The slot-shaped aperture through the sleeve may alternatively consist of a row of regularly spaced ports correspondingly arranged along a straight line or single-turn helix.

One end of the helical duct constituted by the helical groove of this arrangement is closed so that fluid entering the other end will flow through the duct until it reaches whichever port is selected to be open to the interior of the sleeve, whereupon it will leave the helical duct to flow out of the restristor via the interior of the sleeve. The sleeve may have a bore size comparable with that of the pipeline to which the restrictor is connected so that the reduction in flow rate will be controlled substantially only by the helical duct through which the fluid is allowed to flow, the length of which is adjustable by rotation of the inner sleeve.

The asymmetric forces generated within this arrangement can make rotation of the inner sleeve difficult at high fluid pressures, and alternative, symmetrical arrangements of co-operating ports and apertures may be used wherein the internal forces generated are counterbalanced. One such arrangement comprises two identical sets of co-operating ports and aperture disposed along opposite sides of the core and inner sleeve respectively. For example, one port may be situated at each 180° half-loop of the multi-turn helical groove, thereby providing two opposing rows of ports, one along each side of the core. Two single-turn helical apertures are then provided in the inner sleeve, each being parallel to, but 180° out of phase with, the other. A more precise counterbalance of the internal forces can be achieved in a second arrangement wherein twin helical grooves are provided in the outer wall of the hollow core, each displaced by 180° from the other in all radial planes of the core. Every 180° or 360° loop of each groove may then be provided with a fluid transfer port through to the inside of the hollow core, the ports being located so that every port of the first groove is exactly opposed within its own radial plane of the core by an identical port of the second groove. Such precise counterbalance may also be achieved in similar arrangements having any even number of helical grooves in the outer wall of the core, or in corresponding arrangements of any odd number of symmetrically disposed helical grooves.

Figure 2:
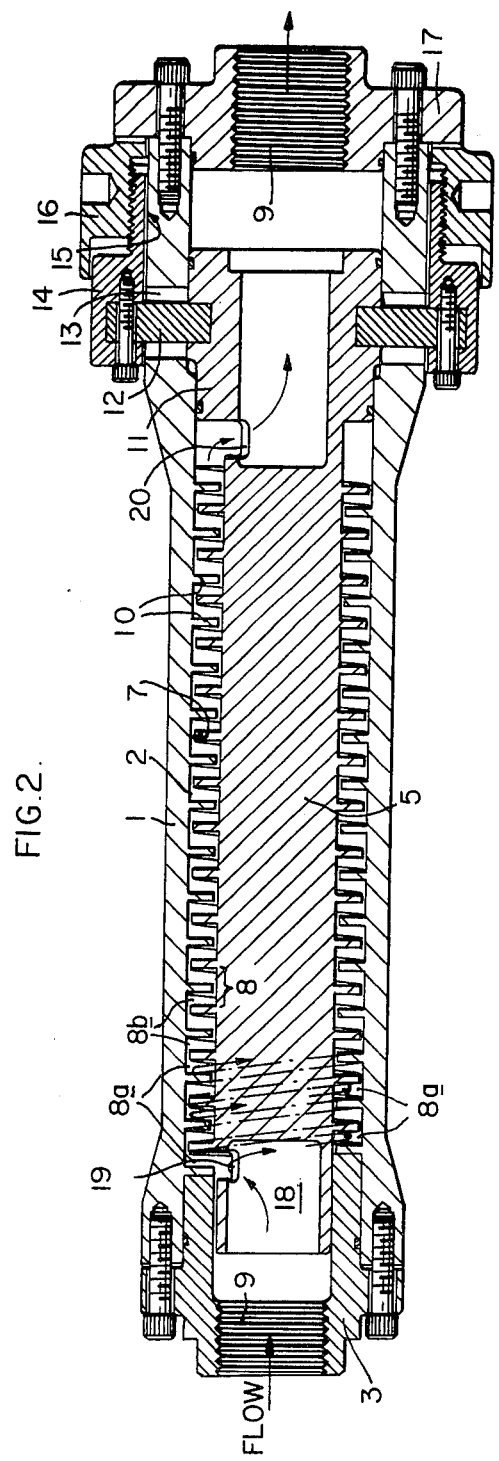
Figure 3:
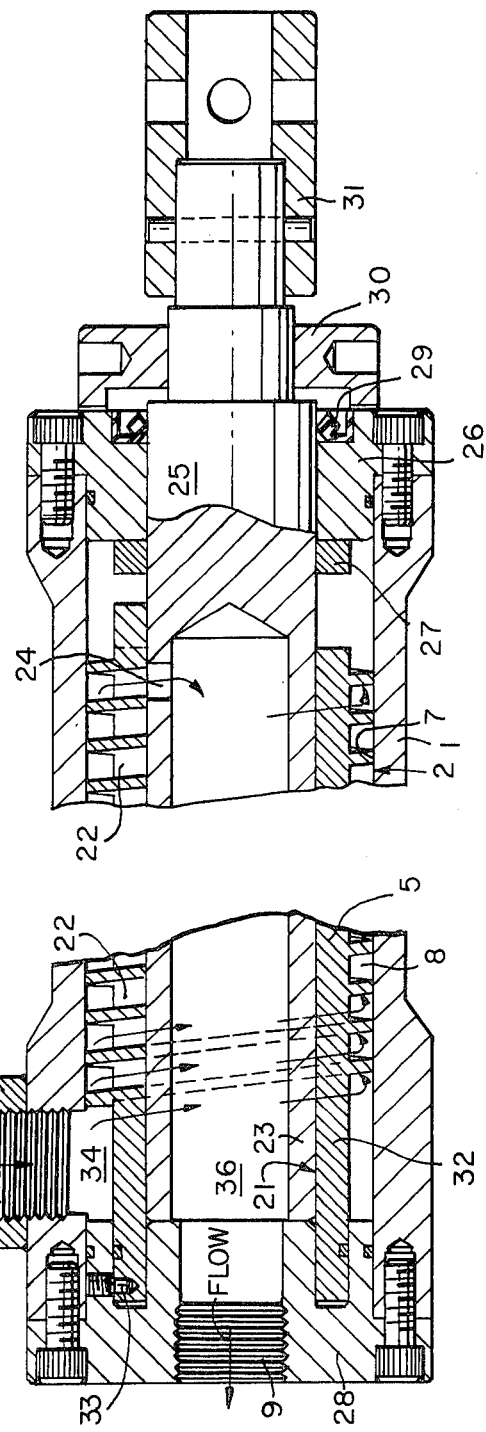
Figure 4:
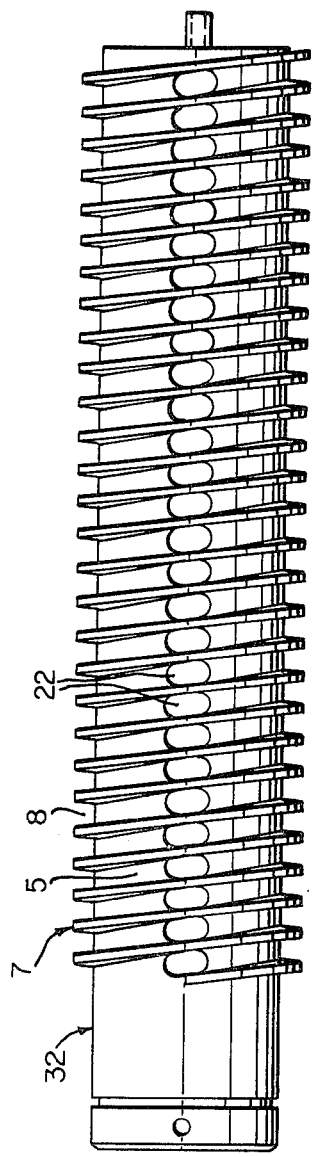
Figure 5:
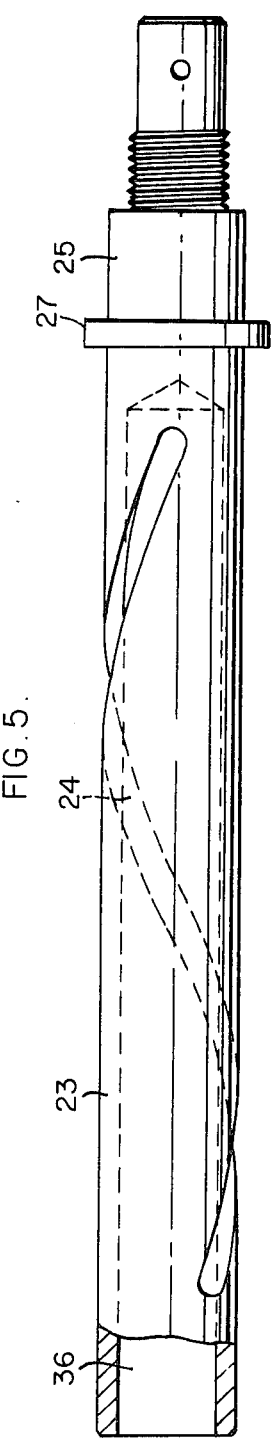

Embodiments of the invention will now be described by way of example only, with reference to the accompanying drawings, of which:

FIG. 1 is a longitudinal part section of a fixed flow restrictor having a helical duct of fixed length and cross-section, FIG. 2 is a longitudinal section of a variable flow restrictor having a helical duct of fixed length and adjustable cross-section, FIG. 3 is a longitudinal part sectional elevation of a variable flow restrictor having a helical duct of adjustable effective length and fixed cross-section, FIG. 4 is an exterior plan view of a hollow core contained within the variable flow restrictor illustrated in FIG. 3 and FIG. 5 is a longitudinal part section of an inner sleeve contained within the hollow core illustrated in FIG. 4.

The fixed flow restrictor illustrated in FIG. 1 comprises a substantially tubular housing 1 having an internal surface 2 and fitted at each end with a detachable pipe union 3. The pipe union 3 is secured to the housing 1 by means of screws 4 and is externally adapted to couple with a corresponding pipe union (not shown) and internally adapted to retain a core 5 within the housing 1 by means of a retaining shoulder 6. The core 5 is a substantially solid cylinder having an external cylindrical surface 7 which extends longitudinally in fluid tight proximity with the internal surface 2 of the housing 1 and is provided along its length with a multi-turn helical groove 8 of uniform, rectangular cross-section.

Fluid entering the flow restrictor via a fluid transfer port 9 in the pipe union 3 at one end of the restrictor i.e. the upstream end, flows through an axial port 18 and radial ports 19 in the upstream end of the core 5 into the helical groove 8, from which it finally emerges to leave the restrictor via a similar arrangement of the ports 19 and 18 in the downstream end of the core 5 and the port 9 in the pipe union 3 at the downstream end of the restrictor.

A variation of the previously described fixed flow restrictor having a helical duct of adjustable cross-section is illustrated at FIG. 2. This embodiment of the invention comprises a substantially tubular housing 1 having an internal surface 2 from which a multi-turn helical fin 10 extends radially inwards to intrude into a corresponding helical groove 8 provided in the external cylindrical surface 7 of a core 5 which core is slideable within the housing 1. The width of the fin 10 in the longitudinal direction of the housing 1 is less than the width of the groove 8 and its radial extension is sufficient to allow the fin to abut the base of the groove 8, thereby dividing the groove into 2 parallel ducts 8a and 8b the relative width of which may be mutually varied by longitudinal movement of the core 5 with respect to the housing 1.

A tubular extension 11 is provided at one end of the core 5 (right-hand end as drawn) to which extension are attached lugs 12 which protrude radially through longitudinal slots 13 in the housing 1 to carry an externally threaded collar 14 which is slideable upon the outer surface 15 of the housing 1 throughout the range of the slots 13. An internally threaded adjustable collar 16 rotatably engages an end thrust face of an outlet pipe union 17 mounted at the end of the housing 1, the internal thread of which collar 16 is arranged to engage with the external thread of the slideable collar 14 such that rotation of the adjustable collar 16 produces longitudinal movement of the slideable collar 14 and hence of the attached core 5 with respect to the housing 1.

In operation, fluid enters the left-hand end of the restrictor (as drawn) through an axial fluid transfer port 9 in a pipe union 3 attached to the housing 1 and flows via an axial port 18 and a radial port 19 in the upstream end of the core 5, into the helical duct of adjustable cross-section constituted by the duct 8a only, the duct 8b being inaccessible to incoming fluid. After traversing the length of the duct 8a the fluid flows into the tubular extension 11 via a radial port 20 in the wall of the extension 11 and emerges from the restrictor via an axial fluid transfer port 9 in the pipe union 17.

A second arrangement of a variable flow restrictor provided with a helical duct of adjustable length, is illustrated in FIG. 3. This embodiment of the invention comprises a substantially tubular housing 1 having an internal surface 2 which is alight interference fit with an external cylindrical surface 7 of an open-ended, tubular core 5, having an internal surface 21. A multi-turn helical groove 8 of rectangular cross-section is provided along the length of the external surface 7 of the core 5, each full revolution of which is provided with a radial fluid transfer port 22 through the wall of the core 5 (see FIG. 4), all of which fluid transfer ports 22 are located in a single axial row along the length of the core 5.

Within the core 5 and in close proximity with the internal surface 21 of the core 5 there is mounted a rotatable tubular sleeve 23 having a bore 36 and provided with a slot-shaped aperture 24 (see FIG. 5), arranged along its length in the form of a single, 320° turn of a helix, axially extending to occupy a length equal to the axial length of the helical groove 8 in the adjacent core 5. The tubular sleeve 23 is closed at one end, which end further extends into a solid shaft 25 which protrudes through an end cover 26 attached to the housing 1. The protruding end of the shaft 25 is provided with a shaft seal 29, a securing cap 30 and an adjusting handle 31.

The sleeve 23 is longitudinally retained within the housing by a radially extending, circular flange 27 protruding from the sleeve 23, which flange 27 abuts the end cover 26, the other end of the sleeve 23, i.e. the open end, abutting an end cover 28 attached to the housing 1. The end cover 28 is externally adapted for connection with a pipeline (not shown) and internally provided with an axial transfer port 9 which communicates with the bore 36 of the sleeve 23.

The core 5 is secured to the end cover 28 of the housing 1, by means of screws 33 and is provided at this end with an end portion 32 of reduced external diameter equal to the root diameter of the grooved core, and longitudinally extending from the end cover 28 to the commencement of the helical groove 8. An annular chamber 34 is thus formed between the housing 1 and the core 5, which chamber provides fluid communication between the helical duct constituted by the groove 8 and a radial fluid transfer port 9 through the cylindrical wall of the housing 1 provided by a pipe union 35 mounted adjacent the chamber 34.

In operation, fluid enters the fluid transfer port 9 of the union 35 and flows through the restrictor via the chamber 34, the groove 8, the one port 22 which is in alignment with the aperture 24, the aperture 24 and the bore 36, to emerge through the fluid transfer port 9 of the end cover 28. The length of the groove 8 traversed by the fluid may be adjusted by rotation of the sleeve 23 by means of the handle 31.

We claim:

1. A fluid flow restrictor comprising a housing adapted for attachment between a first and a second length of a pipeline, said housing having an internal helical duct arranged in fluid communication with the said first length of pipeline, a series of fluid transfer ports regularly disposed along the length of said helical duct so as to provide fluid communication between said helical duct and said axial duct, and a sleeve having an axial duct coaxially located within said helical duct and arranged in fluid communication with said second length of pipeline being adapted to rotate and which is in the form of a hollow cylinder fitted coaxially within said helical duct in fluid-tight proximity with the walls thereof so as to close said fluid transfer ports, said sleeve being provided with at least one radial aperture disposed along the length of the sleeve in the form of a single-turn helix, which aperture is successively alignable with every one of said fluid transfer ports by rotation of said sleeve through no more than one complete revolution thereby to permit selective opening of any one of said fluid transfer ports to said axial duct so as to vary the effective path length of said helical duct.

2. A fluid flow restrictor as claimed in claim 1 wherein said housing comprises a substantially cylindrical tube containing a hollow cylindrical core having an axial outer surface which bears a helical groove throughout its length, said outer surface being arranged in fluid-tight proximity with the internal wall of said cylindrical tube, thereby defining said helical duct; and said hollow cylindrical core having an axial inner surface which defines said axial duct and locates said rotatable sleeve, one end of which sleeve is open and arranged in fluid communication with a pipe union axially located in the adjacent end of said cylindrical tube, the other end being closed and fitted with a fluid-tight shaft which protrudes through the closed other end of said cylindrical tube; said cylindrical tube being provided with a radially fitted pipe union arranged in fluid communication with one end of the said helical duct, the other end of which is closed.

* * * * *